United States Patent
Su et al.

(10) Patent No.: US 9,007,263 B2
(45) Date of Patent: Apr. 14, 2015

(54) PHASE ROTATION TECHNIQUES IN A MULTI-USER WIRELESS COMMUNICATION ENVIRONMENT

(75) Inventors: Chi-Lin Su, Hsinchu (TW); Ning Zhang, Saratoga, CA (US)

(73) Assignee: QUALCOMM Incorporated, San Diego, CA (US)

(*) Notice: Subject to any disclaimer, the term of this patent is extended or adjusted under 35 U.S.C. 154(b) by 425 days.

(21) Appl. No.: 12/939,769

(22) Filed: Nov. 4, 2010

(65) Prior Publication Data

US 2012/0062421 A1 Mar. 15, 2012

Related U.S. Application Data

(60) Provisional application No. 61/381,439, filed on Sep. 9, 2010.

(51) Int. Cl.
*H04B 7/06* (2006.01)
*H04B 7/04* (2006.01)

(52) U.S. Cl.
CPC ............ *H04B 7/0634* (2013.01); *H04B 7/0417* (2013.01); *H04B 7/0452* (2013.01); *H04B 7/0626* (2013.01); *H04B 7/0682* (2013.01)

(58) Field of Classification Search
USPC .......... 342/372–373; 375/267, 299, 347, 349; 455/278.1
See application file for complete search history.

(56) References Cited

U.S. PATENT DOCUMENTS

| | | | |
|---|---|---|---|
| 5,172,343 A | 12/1992 | ODonnell | |
| 5,424,743 A * | 6/1995 | Ghiglia et al. | 342/25 C |
| 6,591,019 B1 * | 7/2003 | Comair et al. | 382/248 |
| 6,785,520 B2 | 8/2004 | Sugar et al. | |

(Continued)

FOREIGN PATENT DOCUMENTS

| | | |
|---|---|---|
| CN | 1832388 | 9/2006 |
| CN | 101288245 | 10/2008 |

(Continued)

OTHER PUBLICATIONS

R.T. Becker, Precoding and Spatially Multiplexed MIMO in 3GPP Long-Term Evolution, High Frequency Electronics, Oct. 2009.*

(Continued)

*Primary Examiner* — Gregory C Issing
*Assistant Examiner* — Fred H Mull
(74) *Attorney, Agent, or Firm* — DeLizio Gilliam, PLLC

(57) ABSTRACT

A mechanism for mitigating inter-user interference in a multi-user wireless communication environment is disclosed. A first network device determines a plurality of steering matrices, associated with a corresponding plurality of subcarriers, for each of at least a subset of destination devices associated with the first network device. A phase difference between corresponding steering vectors of each pair of consecutive steering matrices of the plurality of steering matrices associated with each of the subset of destination devices is determined and phase rotation is performed to maintain phase continuity between the consecutive steering matrices. One or more pre-coding matrices are calculated based on at least a subset of the plurality of steering matrices associated with the subset of destination devices. The one or more pre-coding matrices are applied to data to be transmitted to the subset of destination devices to mitigate interference between each of the subset of destination devices.

20 Claims, 8 Drawing Sheets

(56) References Cited

U.S. PATENT DOCUMENTS

| | | | |
|---|---|---|---|
| 7,385,914 B2 | 6/2008 | Choi et al. | |
| 7,561,632 B1 | 7/2009 | Zelst et al. | |
| 7,676,007 B1 | 3/2010 | Choi et al. | |
| 7,787,554 B1 | 8/2010 | Nabar et al. | |
| 7,822,128 B2* | 10/2010 | Maltsev et al. | 375/260 |
| 8,077,091 B1* | 12/2011 | Guigne et al. | 342/465 |
| 8,139,672 B2 | 3/2012 | Gore et al. | |
| 8,229,017 B1* | 7/2012 | Lee et al. | 342/432 |
| 8,264,407 B2 | 9/2012 | Su et al. | |
| 2006/0056531 A1 | 3/2006 | Li et al. | |
| 2007/0041457 A1 | 2/2007 | Kadous et al. | |
| 2007/0064829 A1* | 3/2007 | Zheng et al. | 375/267 |
| 2008/0095268 A1 | 4/2008 | Aldana | |
| 2008/0102760 A1 | 5/2008 | McConnell et al. | |
| 2008/0192846 A1* | 8/2008 | Bjerke et al. | 375/260 |
| 2008/0297416 A1* | 12/2008 | Samson, Jr. | 342/377 |
| 2009/0195453 A1* | 8/2009 | Kim | 342/373 |
| 2009/0252251 A1 | 10/2009 | Tosato et al. | |
| 2010/0019954 A1* | 1/2010 | Mizutani et al. | 342/147 |
| 2010/0056059 A1 | 3/2010 | Lakshmanan et al. | |
| 2011/0122961 A1* | 5/2011 | Sang et al. | 375/267 |
| 2012/0014415 A1 | 1/2012 | Su et al. | |

FOREIGN PATENT DOCUMENTS

| | | |
|---|---|---|
| CN | 101310454 | 11/2008 |
| EP | 2614595 | 7/2013 |
| JP | 2003086233 | 3/2003 |
| JP | 2006229766 | 8/2006 |
| JP | 2010515404 | 5/2010 |
| JP | 201210180 | 1/2012 |
| KR | 20130053447 | 5/2013 |
| WO | 2007024935 | 3/2007 |
| WO | 2007038356 | 4/2007 |
| WO | 2009081580 | 7/2009 |
| WO | WO2012051172 | 4/2012 |

OTHER PUBLICATIONS

L. U. Choi, Multiuser MISO and MIMO transmit signal processing for wireless communication, PhD Thesis, The Hong Kong University of Science and Technology, Mar. 2003.*

International Search Report and Written Opinion—PCT/US2011/050864—ISA/EPO—Dec. 12, 2011, 7 pages.

International Search Report and Written Opinion—PCT/US2011/055756—ISA/EPO—Jan. 26, 2012, 10 pages.

PCT Application No. PCT/US2011/055756, entitled "Transmitter beamforming steering matrix processing and storage", filed on Oct. 11, 2011, 40 pages.

U.S. Appl. No. 12/388,683 Final Office Action, Jan. 20, 2012, 12 pages.

U.S. Appl. No. 12/388,683 Office Action, May 30, 2012, 16 pages.

Co pending U.S. Appl. No. 13/560,818, filed Jul. 27, 2012, 42 pages.

"U.S. Appl. No. 12/388,683 Office Action", Jul. 25, 2011, 13 pages.

U.S. Appl. No. 12/388,683, filed Feb. 19, 2009, Su, Chi-Lin et al.

U.S. Appl. No. 12/388,688, filed Feb. 19, 2009, Su, Chi-Lin et al.

U.S. Appl. No. 12/901,926, filed Oct. 11, 2010, Su, Chi-Lin et al.

U.S. Appl. No. 61/381,439, filed Sep. 9, 2010, Su, Chi-Lin et al.

"U.S. Appl. No. 12/388,688 Office Action ", Apr. 28, 2010, 5 pages.

Spencer, Quentin H. et al., "Zero-Forcing Methods for Downlink Spatial Multiplexing in Multiuser MIMO Channels", *IEEE Transactions on Signal Processing*, vol. 52, No. 2, Feb. 2004, 11 pages.

International Preliminary Report on Patentability—PCT/US2011/050864, Nov. 7, 2012, 7 pages.

International Preliminary Report on Patentability—PCT/US11/55756, Nov. 30, 2012, 4 pages.

"U.S. Appl. No. 12/388,683 Final Office Action", Feb. 1, 2013, 15 pages.

"U.S. Appl. No. 13/560,818 Office Action", Apr. 10, 2013, 12 pages.

"Japanese Application No. 2013-528291, Office Action", Nov. 12, 2013, 6 pages.

Bala, Erdem et al., "Zero-Forcing Beamforming Codebook Design for MU-MIMO OFDM Systems", Vehicular Technology Conference, 20008. VTC 2008-Fall. IEEE 68th Sep. 24, 2008, pp. 1-5.

Nishimori, et al., "Experimental results with 16X16 MU-MIMO transmission considering adaptive modulation scheme", IEICE Technical Report, vol. 108, No. 304 Nov. 12, 2008, pp. 85-90.

Chinese Application No. 201180043485.7, Office Action, Apr. 30, 2014, 12 pages.

European Patent Application No. 11824139.7, European Search Report, Feb. 25, 2014, 7 pages.

Japanese Application No. 2013-528291, Office Action, Mar. 17, 2014, 6 pages.

Korean Patent Application No. 2013-7009001, KIPO Notice of Grounds for Rejection, Feb. 25, 2014, 6 pages.

Ribeiro, et al., "Performance of linear multi-user MIMO precoding in LTE system", Wireless Pervasive Computing, 2008. ISWPC 2008. 3rd International Symposium on, IEEE, Piscataway, NJ, USA, XP031281271, May 7, 2008, pp. 410-414.

"Korean Patent Application No. 2013-7009001, KIPO Second Notice of Grounds for Rejection", Aug. 28, 2014, 8 pages.

* cited by examiner

PHASE ROTATION TECHNIQUES IN A MULTI-USER WIRELESS COMMUNICATION ENVIRONMENT

RELATED APPLICATION

This application claims the priority benefit of U.S. Provisional Application Ser. No. 61/381,439 filed on Sep. 9, 2010.

INTRODUCTION

Embodiments of the inventive subject matter generally relate to the field of wireless communication, and, more particularly, to phase rotation techniques in a multi-user wireless communication environment.

In a multiple-input multiple-output (MIMO) system, a transmitter uses multiple transmit antennas to transmit data to a receiver with multiple receive antennas to improve communication performance and data throughput. Communication performance of a MIMO system can be further improved using beamforming techniques. Beamforming improves the directionality of the multiple transmit antennas. For beamforming, one or more steering matrices are applied to data to be transmitted to ensure that signals transmitted from the multiple transmit antennas arrive constructively at a specified receiver. Beamforming also reduces interference to other receivers since the transmitted signals arrive destructively at receivers other than the specified receiver. MIMO systems can also enable increase in signal to interference ratio (SIR) and signal to noise ratio (SNR) at the receiver. If the channel information is known at the receiver, maximal ratio combining (MRC) can be used. If the channel information is known at the transmitter, transmit beamforming (TxBF) can be exploited to cancel the multipath interference and increase the SNR and the SIR of the receiver. On the other hand, multiple data streams can be transmitted through multi spatial streams, in the same packet, to multiple destination devices in MIMO system to increase the throughput.

SUMMARY

Various embodiments for phase rotation and interpolation techniques in a multi-user environment are disclosed. In one embodiment, a plurality of beamforming steering matrices for at least a subset of a plurality of destination network devices associated with a first network device are determined at the first network device. The plurality of beamforming steering matrices are associated with a corresponding plurality of subcarriers of an RF signal received at the first network device from the subset of the destination network devices. For each of the subset of the destination network devices, a phase difference between corresponding beamforming steering vectors of each pair of consecutive beamforming steering matrices of the plurality of beamforming steering matrices associated with the destination network device is determined at the first network device. For each of the subset of the destination network devices, phase rotation is performed on the corresponding beamforming steering vectors of each pair of consecutive beamforming steering matrices based on the determined phase difference associated with the corresponding beamforming steering vectors of each pair of consecutive beamforming steering matrices to improve phase continuity between consecutive beamforming steering matrices associated with the destination network device. One or more pre-coding matrices associated with the subset of the destination network devices is calculated based on at least a subset of the plurality of beamforming steering matrices associated with the subset of the destination network devices. The one or more pre-coding matrices are applied to data to be transmitted by the first network device to at least the subset of the destination network devices to mitigate interference between each of the subset of the plurality of destination network devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
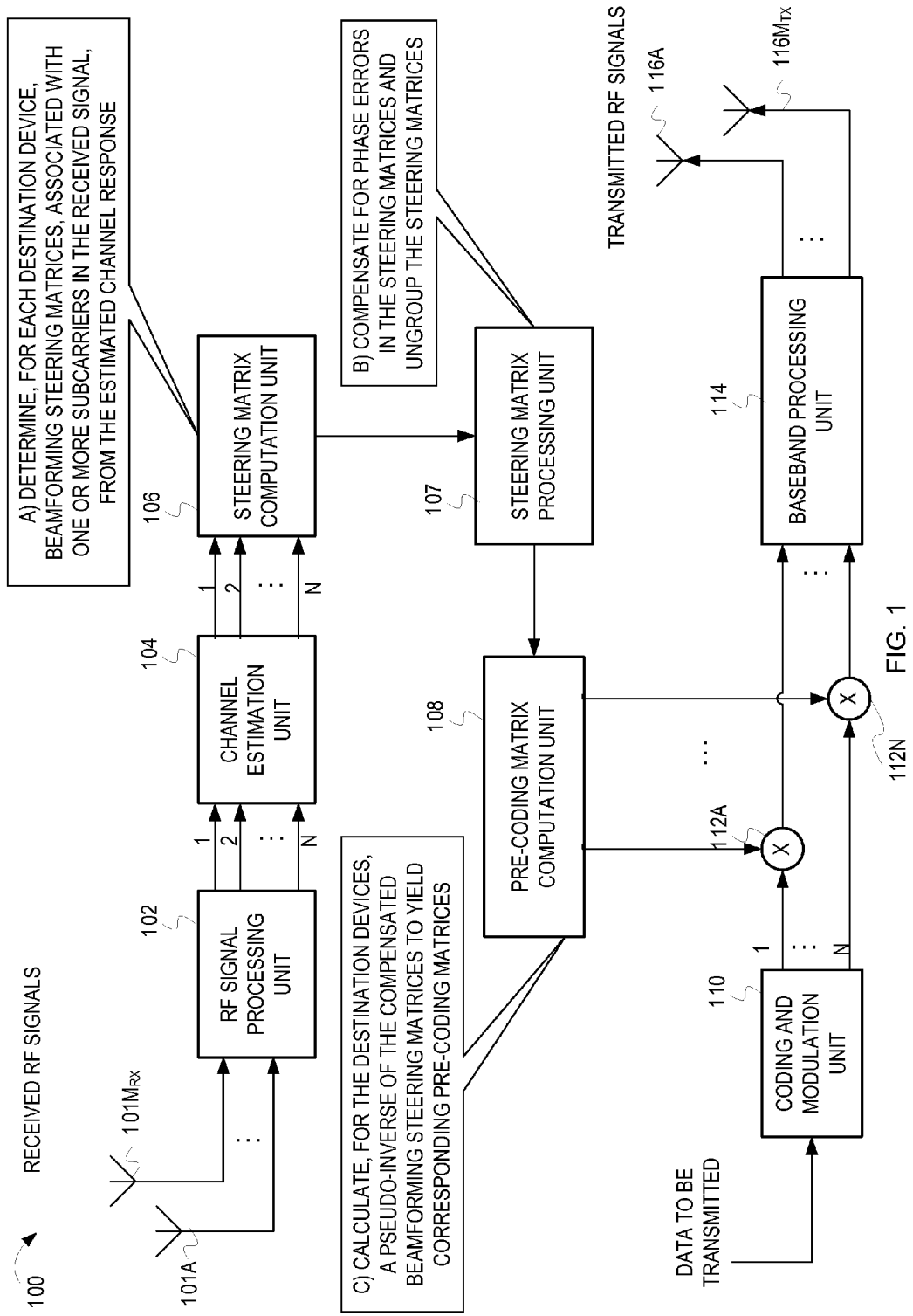
FIG. 1 is a block diagram of one embodiment of a transceiver configured to determine and apply pre-coding matrices for mitigating interference in a multi-user environment.

The description that follows includes exemplary systems, methods, techniques, instruction sequences, and computer program products that embody techniques of the present inventive subject matter. However, it is understood that the described embodiments may be practiced without these specific details. For instance, although examples refer to multiple-input multiple-output (MIMO) orthogonal frequency division multiplexing (OFDM), other suitable modulation and coding scheme may be used. The described techniques may also be applied to systems with a single receive chain. Also, although examples refer to techniques for wireless communication, embodiments may be used in a variety of communication systems. In other instances, well-known instruction instances, protocols, structures, and techniques have not been shown in detail in order not to obfuscate the description.

Beamforming is a spatial diversity technique typically used to improve directionality of a signal transmitted by a MIMO system. In a MIMO-OFDM system, OFDM signals transmitted by multiple antennas comprise a plurality of OFDM subcarriers. Each OFDM subcarrier is associated with one or more steering vectors which can be calculated by singular value decomposition (SVD) of the channel response. A downlink multi-user (DL-MU) environment, supported by the 802.11ac draft specification can be implemented by using multiple stations in MIMO systems. In the DL-MU environment, a transmitting device (e.g., an access point) can transmit different data streams to multiple different destination devices (e.g., wireless local area network (WLAN) stations) in the same packet. The DL-MU environment can increase the capacity of the MIMO system. However, transmitting different data streams to the multiple destination devices could result in interference between the destination devices ("inter-user interference") and reduce the performance of the transmitting and the destination devices, if there is imperfect spatial separation between the destination devices.

The transmitting device can implement functionality in the downlink multi-user environment to cancel the inter-user interference and also to perform beamforming for each destination device for achieving the maximum channel capacity. The transmitting device can overcome inter-user interference between the destination devices by applying a pre-coding matrix to the data prior to generating and transmitting the data streams to the destination devices connected (wirelessly) to the transmitting device. In particular, when the channel information is known at the transmitting device, the transmitting device can multiply a pre-coding matrix to separate spatial streams and mitigate the interference of the signals that are transmitted to the destination devices. Each destination device connected to the transmitting device can determine channel estimates of a channel between the transmitting device and the corresponding destination device. Steering matrices associated with each destination device can be calculated, from the channel estimates, either by the destination device or by the transmitting device. The transmitting device can calculate a pseudo-inverse of equivalent steering matrices which comprises the steering matrices determined from all the destination devices connected to the transmitting device to calculate a corresponding pre-coding matrix. Furthermore, prior to calculating the pre-coding matrix, the transmitting device can also determine and ensure that steering vectors (i.e., columns of a steering matrix) of steering matrices of each destination device are phase-continuous in the frequency domain. In other words, the transmitting device can ensure phase continuity of the steering matrices of each destination device, to reduce steering matrix interpolation errors. The phases of the steering vectors that exhibit phase discontinuity can be corrected to help ensure that the appropriate phase continuous pre-coding matrices are applied to the data to be transmitted. In ensuring phase continuity between the pre-coding vectors of consecutive pre-coding matrices, the equivalent channel at the each destination device can be phase continuous. Phase rotation of the steering vectors of the corresponding steering matrices can be performed to ensure the phase continuity and to maintain the directionality of the transmitted signal. Channel smoothing at the destination device can be calculated for the phase continuous equivalent channel. This can improve the performance of the communication system and can improve data throughput.

FIG. 1 is a block diagram of one embodiment of a transceiver 100 configured to determine and apply pre-coding matrices for mitigating interference in a multi-user environment. The transceiver 100 depicted in FIG. 1 comprises $M_{RX}$ receive chains and $M_{TX}$ transmit chains. Antennas 101A ... 101$M_{RX}$ receive RF signals. The antennas are coupled with an RF signal processing unit 102. The RF signal processing unit 102 coupled with a channel estimation unit 104. The channel estimation unit 104 is coupled with a steering matrix computation unit 106, which in turn is coupled with a steering matrix processing unit 107. The steering matrix processing unit 107 is coupled with a pre-coding matrix computation unit 108. A coding and modulation unit 110 receives data to be transmitted and is coupled with N multipliers 112A ... 112N. The pre-coding matrix computation unit 108 is also coupled with the N multipliers 112A ... 112N. The outputs of the N multipliers 112A ... 112N are provided to a baseband processing unit 114. $M_{TX}$ transmit antennas 116A ... 116$M_{TX}$ transmit the $M_{RX}$ outputs of the baseband processing unit 114.

The receive antennas 101A ... 101$M_{RX}$ receive the RF signals and provide the received RF signals to the RF signal processing unit 102. The RF signal processing unit 102 can comprise functionality to implement packet detection, signal amplification, filtering, analog to digital (A/D) conversion, conversion from time domain to frequency domain, etc. Typically, each of the $M_{RX}$ receive chains comprise distinct amplifiers, mixers, Fast Fourier Transforms (FFT) units, A/D converters, etc. The RF signal processing unit 102 can also comprise a demultiplexing unit (not shown). In a MIMO-OFDM system, the data from the $M_{RX}$ receive chains can be converted from the time domain to the frequency domain (e.g., by the FFT units) and N independent data streams corresponding to N independent OFDM sub-carriers can be generated. The N independent data streams are provided to a channel estimation unit 104. The channel estimation unit 104 uses training symbols in the received data streams to determine a channel matrix (comprising channel estimates) corresponding to each OFDM sub-carrier. In some implementations, a single channel matrix may be determined from the received data streams. The channel estimation unit 104 may implement additional functionality to decompose the single channel matrix into channel matrices for each of the N OFDM sub carriers.

At stage A, the steering matrix computation unit 106 determines one or more steering matrices associated with the N OFDM sub-carriers by performing singular value decomposition (SVD) on the estimated channel matrices (determined by the channel estimation unit 104). Thus, for the N OFDM sub-carriers there are at least N steering matrices. The number of rows and columns in each of the N steering matrices depends on the number of space-time streams and the rank of estimated channel corresponds to each subcarrier. For N steering matrices, with an order of $M_{TX} \times \text{rank}(H_n)$ where $H_n$ is the channel response that corresponds to subcarrier n, the total number of elements to be stored is $\Sigma_{n=1}^{N} M_{TX} \times \text{rank}(H_n)$. In the multi-user environment, the steering matrix computation unit 106 can determine an estimated channel matrix associated with each user (or each destination device). The steering matrix computation unit 106 can compute a steering matrix for each estimated channel matrix associated with each destination device.

At stage B, the steering matrix processing unit 107 compensates for phase errors in the steering matrices and decompresses and un-groups the steering matrices (if necessary). The steering matrix processing unit 107 can analyze the steering matrices to ensure phase continuity across the steering matrices. The steering matrix processing unit 107 can also perform phase rotation to ensure that there is phase continuity across the same column of steering matrices (i.e., steering vectors) associated with consecutive sub-carriers ("corresponding steering vectors of the consecutive steering matrices"). In some implementations, the steering matrix processing unit 107 can receive grouped steering matrices (e.g., from a destination device) and can interpolate the steering matrices. The OFDM subcarriers associated with the particular channel can be sub-sampled and steering matrices (which may be previously compressed) associated with the sub-sampled subcarriers can be retained. For example, a grouping factor of 2 implies that the steering matrix associated with every other sub-carrier of a particular channel is retained. The other steering matrices associated with other sub-carriers of the particular channel may be discarded. It is noted, however, that in other examples a different grouping factor may be utilized, e.g., a grouping factor of 4. In some implementations, the steering matrices may be compressed to minimize the amount of memory required to store the steering matrices.

Steering matrix compression can take advantage of the fact that the columns of the steering matrices are inter-dependent and can, therefore, be represented using fewer independent parameters. For example, as defined in the IEEE 802.11n, steering matrices can be compressed by representing a steering matrix by a pair of angles. Compressing and/or grouping the steering matrices can reduce the amount of memory required to store the steering matrices and can also reduce feedback overhead. If the steering matrices were compressed and/or grouped, the steering matrix processing unit 107 can decompress and/or ungroup (or interpolate) the steering matrices to generate steering matrices associated with all the sub-carriers of the destination device.

At stage C, the pre-coding matrix computation unit 108 calculates a pseudo-inverse of equivalent steering matrices to yield corresponding pre-coding matrices. The equivalent steering matrices represent a combination of steering matrices from all destination devices. In one example, the pre-coding matrix computation unit 108 can determine one steering matrix per sub-carrier, for each destination device. The pre-coding matrix computation unit 108 can combine, a steering matrix associated with each destination device for a particular sub-carrier, to yield an equivalent steering matrix for the particular sub-carrier. The pre-coding matrix computation unit 108 can determine a pseudo-inverse for the equivalent steering matrix that is a combination of the steering matrices for the particular sub-carrier of all the destination devices to yield a pre-coding matrix associated with all the destination devices for the particular sub-carrier. The transceiver 100 can appropriately apply the pre-coding matrices associated with each destination device to each data stream to be transmitted to the destination devices. The coding and modulation unit 110 receives a stream of data (e.g., in the form of information bits) to be transmitted for M destination devices, where each destination device has $N_{ss}$ spatial streams, splits the data stream into $M \times N_{ss} \times N$ independent data streams (corresponding to M destination devices, $N_{ss}$ spatial streams of each of the destination devices, and N independent sub-carriers), and encodes the data streams. Multipliers 112A ... 112N apply the N pre-coding matrices to the corresponding data streams to generate $M_{TX} \times N$ pre-coded data streams. A baseband processing unit 114 receives the $M_{TX} \times N$ beamformed data streams. The baseband processing unit 114 can comprise inverse Fast Fourier Transform (IFFT) units (which convert N subcarriers into time domain), modulators, amplifiers, etc. in each of the $M_{TX}$ transmit chains. The baseband processing unit 114 processes the $M_{TX}$ data streams to generate $M_{TX}$ RF signals. Antennas 116A ... 116$M_{TX}$ transmit the $M_{TX}$ RF signals to multiple destination devices (not shown in FIG. 1).

Figure 2A:
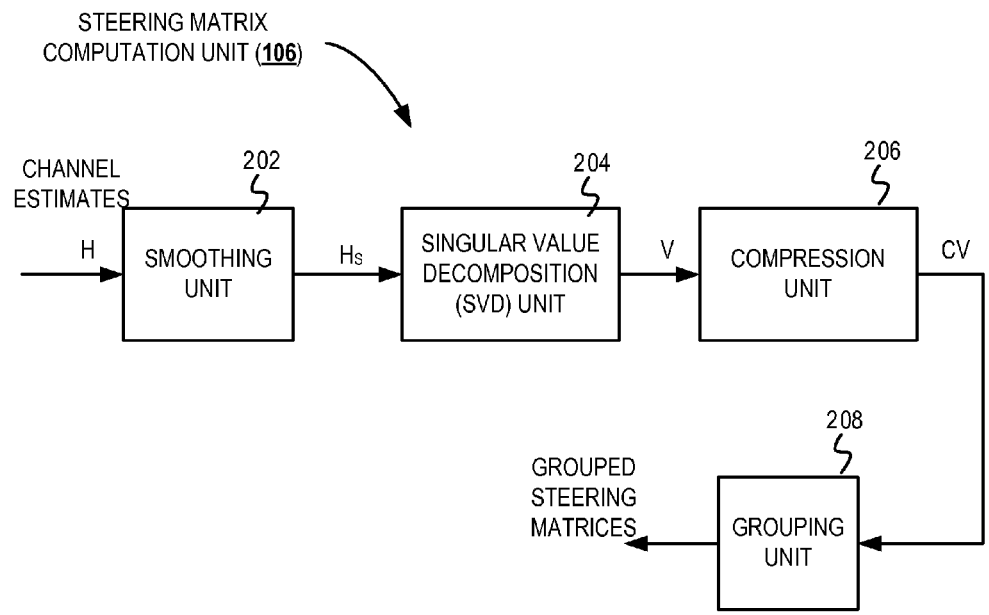
FIG. 2A is a block diagram of one embodiment of the steering matrix computation unit.

FIG. 2A is a block diagram of one embodiment of the steering matrix computation unit 106 of FIG. 1. The steering matrix computation unit 106 comprises a smoothing unit 202, a singular value decomposition (SVD) unit 204, a compression unit 206, and a grouping unit 208.

The smoothing unit 202 receives channel estimates (H), e.g., from the channel estimation unit 104 of FIG. 1. As described earlier, the channel estimation unit generates a different channel matrix for each OFDM sub-carrier and each OFDM sub-carrier is associated with a distinct steering matrix. The smoothing unit 202 is a filter with a response tailored to minimize the effects of noise on the channel estimates. In some implementations, a moving average filter may be used as a smoothing filter. In another implementation, the smoothing filter may be any suitable low pass filter. The smoothed channel estimates are represented by $H_s$. The singular value decomposition (SVD) unit 204 decomposes the smoothed channel estimates ($H_s$) to generate one or more steering matrices (V) corresponding to each OFDM subcarrier.

The compression unit 206 receives the steering matrices associated with each OFDM subcarrier and compresses the steering matrices (V). In some implementation, the compression unit 206 may represent a steering matrix by a pair of Givens angles (described by the IEEE 802.11n). The grouping unit 208 receives the compressed steering matrices and retains a pre-defined number of steering matrices. The number of retained steering matrices may be determined based on the compression factor, available storage, permissible overhead, subcarrier error rate, etc. The steering matrix computation unit 106 at each destination device connected to the transmitting device can transmit their respective channel estimates, steering matrices, compressed steering matrices, and/or grouped steering matrices to the transmitting device to enable the transmitting device to calculate a set of pre-coding matrices associated with all the destination devices connected to the transmitting device.

Thus, the transmitting device is aware (e.g., based on feedback received from the destination device) of channel information associated with each destination device connected to the transmitting device. The feedback can be received in the form of channel estimates (H), right singular vectors (i.e., steering matrices V), compressed steering matrices (CV) with or without grouping. Typically, the feedback received in the form of V or CV can only contain the vectors which correspond to non-vanished singular values, thus reducing feedback overhead. Reducing the feedback overhead can help increase the throughput in the DL-MU environment, however if too little feedback is received from the destination devices the performance of the communication channel may be degraded by residual inter user-interference.

Figure 2B:
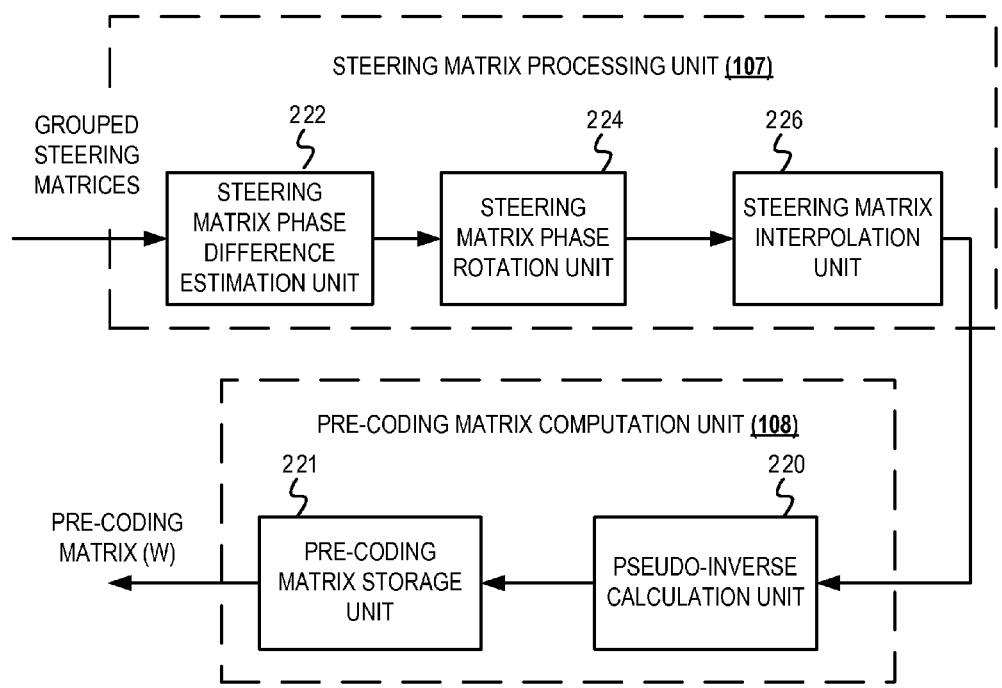
FIG. 2B is a block diagram illustrating generation of pre-coding matrices.

FIG. 2B is a block diagram illustrating generation of pre-coding matrices. FIG. 2B depicts one embodiment of the steering matrix processing unit 107 and the pre-coding matrix computation unit 108. The steering matrix processing unit 107 comprises a steering matrix phase difference estimation unit 222, a steering matrix phase rotation unit 224, and a steering matrix interpolation unit 226. The pre-coding matrix computation unit 108 comprises a pseudo-inverse calculation unit 220 coupled to a pre-coding matrix storage unit 221.

The pre-coding matrix associated with each sub-carrier is calculated independently and the column vectors of the right singular matrices in frequency domain can be rotated by any angle as part of SVD decomposition. In other words, the steering matrices generated by the SVD unit 204 and consequently the pre-coding matrices generated by the pre-coding matrix computation unit 107 may not be not unique (i.e., a channel matrix can have multiple SVD representations). Therefore, the phase across the pre-coding matrices may not be continuous in the frequency domain and the phase difference between the same column of pre-coding matrices (i.e., pre-coding vectors) associated with consecutive sub-carriers ("corresponding pre-coding vectors of consecutive pre-coding matrices") can vary.

Phase continuity across the corresponding pre-coding vectors of consecutive pre-coding matrices can ensure better performance at a destination device. Ensuring phase continuity across the steering matrices prior to generating the pre-coding matrices can ensure that the phase of pre-coding matrices is continuous. Phase continuity across the corresponding steering vectors of consecutive steering matrices can also lead to fewer errors during steering matrix interpolation. Therefore, the steering matrix phase difference estimation unit 222 determines whether there is a phase mismatch between the corresponding steering vectors of consecutive steering matrices. For example, a first sub-carrier may be associated with a first steering matrix and a second consecutive sub-carrier may be associated with a second steering matrix. The phase difference estimation unit 222 can determine whether there is a phase mismatch between a first steering vector of the first steering matrix and a corresponding first steering vector associated with the second steering matrix. If the phase difference is greater than $\pi/2$, the steering matrix phase rotation unit 224 rotates one of the steering vectors by $\pi$ (see FIG. 5). In some implementations, the phase difference estimation unit 222 can cross correlate the corresponding steering vectors of consecutive steering matrices to determine a more precise phase difference (see FIG. 6). The phase rotation unit 224 can shift one of the steering vectors by the determined phase difference. Operations for phase difference estimation and phase rotation are performed for each set of consecutive steering matrices associated with all the sub-carriers for each of the destination devices. In one example, after the phase difference between corresponding steering vectors of each pair of consecutive steering matrices is estimated and corrected for a first destination device, the phase difference between corresponding steering vectors of each pair of consecutive steering matrices is estimated and corrected for a second destination device, etc.

After the steering matrix phase rotation unit 224 rotates one or more corresponding steering vectors of consecutive steering matrices for phase continuity, the steering matrix interpolation unit 226 interpolates the steering matrices to obtain steering matrices associated with all sub-carriers. As described earlier, grouping operations can dictate that only a subset of the steering matrices be stored. However, the number of steering matrices received from each the destination devices connected to the transmitting device may differ from one destination device to another destination device. For example, a first destination device may group its steering matrices with a grouping factor of 4, a second destination device may group its steering matrices with a grouping factor of 2, a third destination device may not group its steering matrices, etc. Therefore, the steering matrix interpolation unit 226 un-groups or interpolates the grouped steering matrices for each destination device prior to providing the steering matrices to the pre-coding matrix computation unit 108. The steering matrix interpolation unit 226 can use any suitable interpolation technique (e.g., linear interpolation, spline interpolation, etc.) to retrieve the steering matrices that were discarded during the grouping process. For example, the steering matrix interpolation unit 226 may determine the Givens angles associated with the discarded steering matrices from the Givens angles associated with the grouped steering matrices (e.g., grouped by the grouping unit 208 of a destination device). The steering matrix interpolation unit 226 may also comprise a smoothing filter to minimize the effects of noise on the steering matrices. It is noted that if compressed steering matrices are received at the steering matrix processing unit 107, a steering matrix decompression unit (not shown) of the steering matrix processing unit 107 can decompress the steering matrices. The steering matrix processing unit 107 can provide the decompressed steering matrices to the steering matrix interpolation unit 226.

The pseudo-inverse calculation unit 220 of the pre-coding matrix computation unit 108 can receive the phase-compensated ungrouped steering matrices and can compute one or more pre-coding matrices associated with the destination devices. In one example, an equivalent steering matrix comprising a combination of the steering matrices of all the destination devices connected to the transmitting device can be calculated for each sub-carrier. The pseudo-inverse calculation unit 220 can calculate the pre-coding matrix for each sub-carrier from the corresponding equivalent steering matrix for the sub-carrier. The pre-coding matrix storage unit 221 can store all the calculated pre-coding matrices so that the pre-coding matrices can be applied to data prior to transmitting the data to the destination devices.

Figure 3:
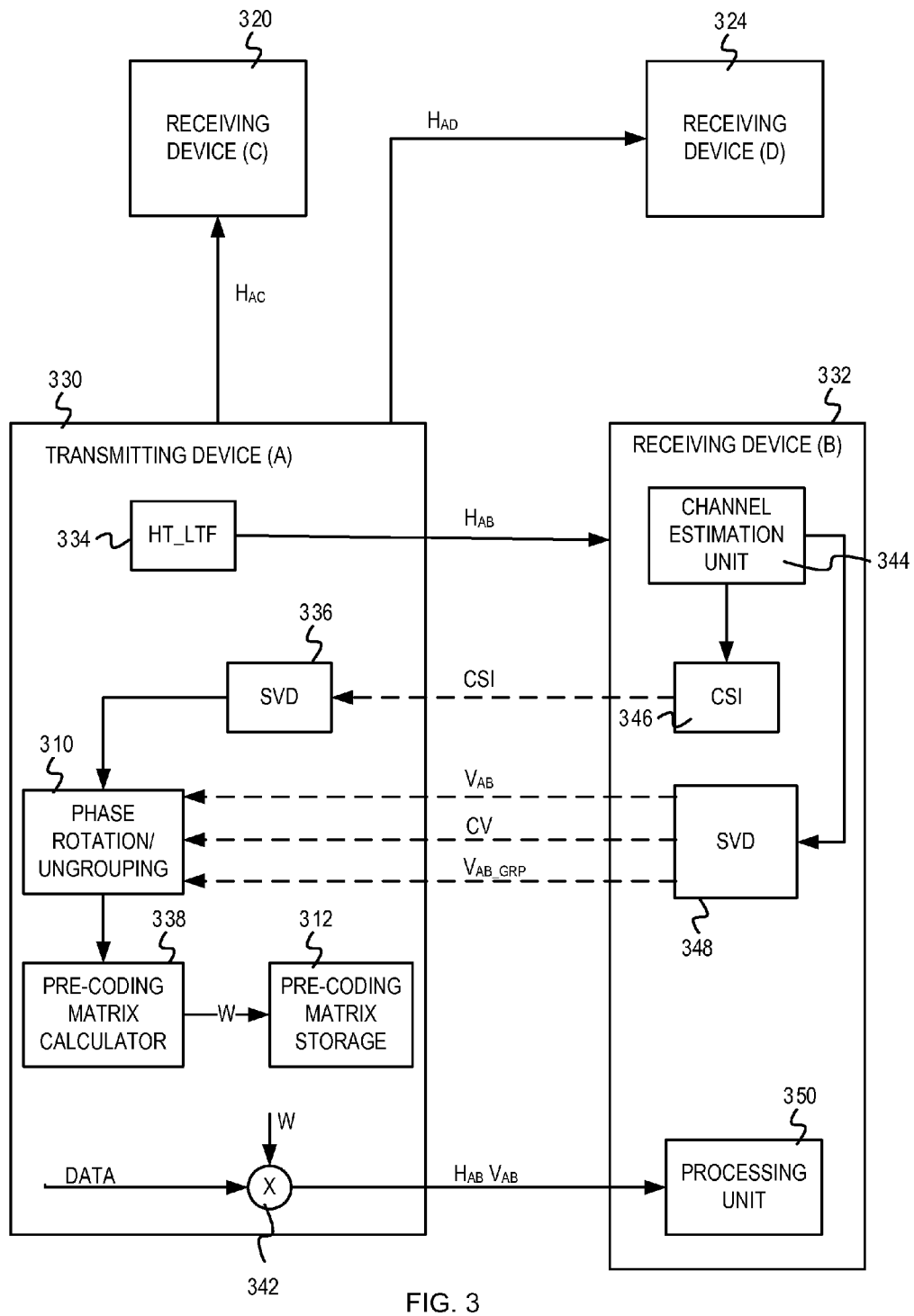
FIG. 3 is a block diagram illustrating an example mechanism for pre-coding matrix generation in a multi-user environment.

FIG. 3 is a block diagram illustrating an example mechanism for pre-coding matrix generation in a multi-user environment. FIG. 3 depicts a transmitting device A 330 that communicates with receiving device B 332, receiving device C 320, and receiving device D 324. The transmitting device 330 may be an access point, while the receiving devices 330, 324, and 332 may be clients (e.g., wireless local area network (WLAN) stations) that communicate with the access point. As depicted in FIG. 3, the transmitting device 330 receives channel information or steering matrices estimated by each of the receiving devices 330, 324, and 332. The transmitting device 330 comprises a SVD unit 336 coupled to a phase rotation/ungrouping unit 310. The phase rotation/ungrouping unit 310 is coupled to a pre-coding matrix calculator 338. The pre-coding matrix calculator 338 is coupled to a pre-coding matrix storage unit 312. The transmitting device 330 also comprises a multiplier 342, which applies the pre-coding matrices to data to be transmitted. Each of the receiving devices 320, 324, and 332 comprise a processing unit 350, which receives the transmitted data. The receiver 332 also comprises a channel estimation unit 344 coupled with a channel state indicator (CSI) unit 346 and an SVD unit 348.

The transmitting device 330 transmits training symbols 334 along a communication channel $H_{AB}$ to the receiving device 332. The training symbols could be high throughput long training fields (HT_LTF) or other suitable training symbols depending on the communication standards employed. The receiving device 332 (or the processing unit 350) may implement functionality to detect the incoming packet, retrieve the training fields 334, and provide the retrieved training fields to the channel estimation unit 344. The channel estimation unit 344 estimates the channel response for one or more of the subcarriers that comprise the received signal. The SVD unit 348 determines the steering matrices, associated with the one or more sub-carriers, from the estimated channel response.

The receiving device 332 may also comprise a compression unit to compress the determined steering matrices. Depending on the capabilities of transmitting device 330 and the receiving device 332, the receiving device 332 transmits any one or more of the channel state information (CSI) (e.g., channel estimates, covariance of channel estimates, etc.), ungrouped and uncompressed steering matrices (V), and the compressed steering matrices (CV), as shown by the dashed lines in FIG. 3. The receiving device 332 may also transmit grouped steering matrices ($V_{AB\_grp}$) to the transmitting device 330. Each receiving device connected to the transmitting device 330 executes the above-described operations. For example, the transmitting device 330 can receive channel estimates ($H_{AB}$) from the receiving device 332, channel estimates ($H_{AC}$) from the receiving device 320, and channel estimates ($H_{AD}$) from the receiving device 324. The number of transmit antennas at the transmitting device 330 is typically greater than or equal to the total number of receive antennas associated with all of the destination devices. In general, the overall channel (H) when M destination devices are connected to the transmitting device 330 is represented by Eq. 1, where $H_1, \ldots, H_M$ represent the channel between the transmitting device and each of the M destination devices.

$$H = \begin{bmatrix} H_1 \\ H_2 \\ \vdots \\ H_M \end{bmatrix} \quad \text{Eq. 1}$$

$$H_m = U_m S_m V_m^* \quad \text{Eq. 2}$$

The channel estimated by the $m^{th}$ destination device can be subject to SVD decomposition as depicted by Eq. 2. In Eq. 2, $H_m$ is a channel matrix with an order of $M_{RX} \times M_{TX}$, where $M_{RX}$ is the number of receive chains and $M_{TX}$ is the number of transmit chains corresponding to each of the OFDM sub-carriers of the $m^{th}$ destination device. $U_m$ is an $M_{RX} \times M_{RX}$ unitary matrix corresponding to each of the OFDM sub-carriers of the $m^{th}$ destination device, $S_m$, is an $M_{RX} \times M_{TX}$ diagonal matrix comprising eigen values of $H_m^* H_m$, and $V_m$ is an $M_{TX} \times M_{TX}$ unitary matrix corresponding to each of the OFDM sub-carriers of the $m^{th}$ destination device. $V_m^*$ denotes a conjugate transpose of $V_m$. The columns of $V_m$ are eigenvectors of $H_m^* H_m$. Therefore, the overall channel matrix (H) can be rewritten as depicted by Eq. 3.

$$H = \begin{bmatrix} U_1 S_1 V_1^* \\ U_2 S_2 V_2^* \\ \vdots \\ U_M S_M V_M^* \end{bmatrix} \quad \text{Eq. 3}$$

As described above with reference to FIGS. 1 and 2, prior to calculating the pre-coding matrices, the phase rotation/ungrouping unit 310 determines whether there is a phase discontinuity between corresponding steering vectors of consecutive steering matrices, and accordingly rotates the phases of the steering vectors to ensure continuity across steering matrices in the frequency domain. The phase rotation/ungrouping unit 310 also decompresses and interpolates the phase compensated steering matrices (if required) to retrieve the steering matrices discarded during the compression and grouping processes.

With reference to Eq. 3, the pre-coding matrix can be used to cancel the right singular vector $V_1 \ldots V_M$ to mitigate inter-user interference. For each destination device, the rank of channel estimated is not the full rank. Therefore, the steering matrix may comprise only rank(H) number of steering vectors. To enable zero inter-user interference and to enable a desired beamforming pattern, the equivalent channel should be of the form that is represented by Eq. 4.

$$H = \text{diag}\left(\begin{bmatrix} U_1 S_1 \\ U_2 S_2 \\ \vdots \\ U_M S_M \end{bmatrix}\right) = \begin{bmatrix} U_1 S_1 & 0 & 0 & 0 \\ 0 & U_2 S_2 & 0 & 0 \\ \vdots & \vdots & \vdots & \vdots \\ 0 & 0 & 0 & U_M S_M \end{bmatrix} \quad \text{Eq. 4}$$

Consequently, the pre-coding matrix (W) for a particular sub-carrier can be calculated as depicted by Eq. 5 where $\hat{V}_m$ only contains the first rank(Hm) column singular vectors and $(.)^*$ represents the Hermitian operation. The steering matrices associated with all the destination devices for a particular sub-carrier are combined to yield an equivalent steering matrix for the particular sub-carrier as depicted in Eq. 5. The dimension of the equivalent steering matrix for the particular sub-carrier can be represented by (rank($H_1$)+rank($H_2$)+ . . . rank($H_M$))×$N_{TX}$, where $N_{TX}$ represents the number of transmit antennas. The column vectors of the pre-coding matrix $W_m$ are the singular vectors of $H_m$ and also belong to the null space of other sub-channels $H_n$ for $\forall n \neq m$.

$$\begin{bmatrix} \hat{V}_1^* \\ \hat{V}_2^* \\ \vdots \\ \hat{V}_M^* \end{bmatrix} \cdot W = \begin{bmatrix} \hat{V}_1^* \\ \hat{V}_2^* \\ \vdots \\ \hat{V}_M^* \end{bmatrix} \cdot [W_1 \quad W_2 \quad \ldots \quad W_M] = I \quad \text{Eq. 5}$$

Therefore, on receiving the channel information, the steering matrices, and/or the grouped/compressed steering matrices from the receiving device 332, the pre-coding matrix calculator 338 calculates a pseudo-inverse of a combination of the received steering matrices to generate the corresponding pre-coding matrices. As an example, in a DL-MU environment, the transmitting device may comprise 4 transmit antennas and may be connected to two destination devices. Each of the destination devices may comprise two receive antennas. In one implementation, this can be represented as (number of transmit antennas, number of receive antennas for destination device 1, number of receive antennas for destination device 2, receive antennas for destination device M), or for this example (4,2,2). The overall channel can be represented by $$H = \begin{bmatrix} h11 & h12 & h13 & h14 \\ h21 & h22 & h23 & h24 \\ h31 & h32 & h33 & h34 \\ h41 & h42 & h43 & h44 \end{bmatrix}$$

The channel estimated by the first destination device is $$H1 = \begin{bmatrix} h11 & h12 & h13 & h14 \\ h21 & h22 & h23 & h24 \end{bmatrix}$$

The channel estimated by the second destination device is $$H2 = \begin{bmatrix} h31 & h32 & h33 & h34 \\ h41 & h42 & h43 & h44 \end{bmatrix}$$

If $V_1$ is the right singular matrix of the channel matrix $H_1$, it may only comprise the singular vectors which correspond to non-vanished (i.e., non-zero) singular values. The dimension of $V_1$ can be 4×rank($H_1$) and the value of rank($H_1$) may not be greater than 2. Likewise, if $V_2$ is the right singular matrix of the channel matrix $H_2$, it may only comprise the singular vectors which correspond to the non-vanished singular values. The dimension of $V_2$ may be 4×rank($H_2$) and the value of rank($H_2$) may not be greater than 2. If $V_1$ and $V_2$ represent the steering matrices associated with the first and the second destination devices, then a combination of steering matrices can be generated by arranging the steering matrices from each destination device into an equivalent steering matrix ($\tilde{V}$). Consequently, the pre-coding matrix W can be calculated as follows where pinv(.) represents the pseudo inverse operation.

$$\tilde{V} = \begin{bmatrix} V_1^* \\ V_2^* \end{bmatrix}$$

$$W = pinv(\tilde{V})$$

The multiplier 342 applies the pre-coding matrices (W) to the data to be transmitted. The resultant data is then provided to one or more antennas for transmission over the communication channel ($H_{AB}$). The transmitting device 330 can calculate, in accordance with operations described herein, phase-compensated steering matrices associated with each of the destination devices 332, 320, and 324. The transmitting device 330 can apply the appropriate pre-coding matrix to appropriate data streams to be transmitted to the destination devices to mitigate interference between the destination devices.

The depicted block diagrams (FIGS. 1-3) are examples and should not be used to limit the scope of the embodiments. For example, although the Figures refer to an OFDM scenario with one steering matrix (and consequently one pre-coding matrix) associated with each of the OFDM subcarriers, any suitable multiplexing and modulation technique (e.g., frequency division multiplexing) may also be used. The transmitting device and/or the receiving devices depicted in the Figures may comprise one or more chains. The number of transmit chains may or may not differ from the number of receive chains. Although FIG. 3 depicts a single multiplier, the number of multipliers may vary depending on the number of pre-coding matrices, the number of receiving devices connected to the transmitting device, and the number of data streams to be transmitted to each of the receiving devices. In some implementations, a single multiplier may successively operate on each data stream. Although FIG. 3 depicts the data being transmitted across a channel immediately after the pre-coding matrices are applied, the transmitter may implement additional functionality such as data multiplexing, data modulation, signal amplification, etc.

Figure 4:
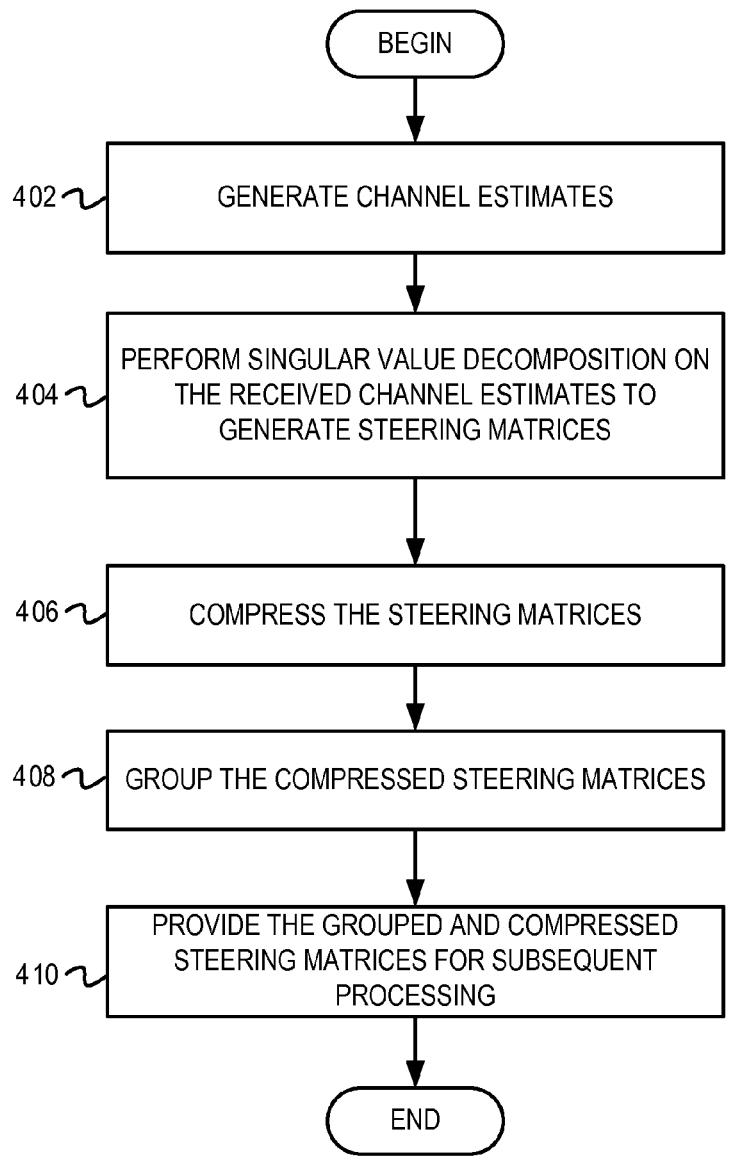
FIG. 4 is a flow diagram illustrating example operations for generating steering matrices.

FIG. 4 is a flow diagram illustrating example operations for generating steering matrices. The flow 400 begins at block 402.

At block 402, channel estimates are generated. For instance, the channel estimates may be generated by the channel estimation unit 344 of the receiving device 332 of FIG. 3. The number of sub-carriers that comprise a received RF signal may influence the number of channel estimates. The flow continues at block 404.

At block 404, singular value decomposition (SVD) is performed on the channel estimates to generate steering matrices. For example, the SVD unit 348 of the receiving device 332 may perform singular value decomposition on the generated channel estimates. As another example, the SVD unit 336 of the transmitting device 330 may perform singular value decomposition on channel estimates received from the receiving device 332. The number of steering matrices depends on the number of subcarriers that comprise a signal. For example, a signal implementing IEEE 802.11n with OFDM comprises 56 subcarriers; therefore, a system that receives the signal may generate 56 steering matrices. The order of the steering matrices may depend on the number of transmit chains and the number of space-time streams. The operations for performing SVD on a channel matrix to generate a steering matrix are described by Eq. 2. After the steering matrices are determined from the channel estimates, the flow continues at block 406.

At block 406, the steering matrices are compressed, e.g., by the receiving device 332. Any suitable technique may be used to compress the steering matrices. For example, the Givens rotation technique described by the IEEE 802.11n may be used to compress the steering matrices. According to the Givens rotation technique, a steering matrix may be represented as a pair of angles. As another example, matrix transformation operations (e.g., Cholesky transformation, LU decomposition, etc.) may be performed on the steering matrices to reduce the number of matrix elements to be stored. A fewer number of bits may be required to store a triangular or a diagonal matrix as compared to a matrix comprising only non-zero elements. The flow continues at block 408.

At block 408, the compressed steering matrices (determined at block 406) are grouped, e.g., by the receiving device 332 (i.e., by the grouping unit 208 of FIG. 2A). Grouping steering matrices can further reduce the number of bits required to store the steering matrices. Typically, steering matrices associated with the one or more OFDM subcarriers are very similar. To group the steering matrices, the subcarriers are sub-sampled and the compressed steering matrices associated with the sub-sampled subcarriers are stored. For example, for a grouping factor of 4 ($N_g=4$), the compressed steering matrices associated with every fourth subcarrier are stored. Thus, the number of bits required for steering matrix storage is reduced by a factor of 4. The grouping factor and the selection of subcarriers may be dependent, at least in part, on an error of transmission associated with each subcarrier. The flow continues at block 410.

At block 410, the grouped and compressed steering matrices are provided for subsequent processing. For example, the receiving device 332 can provide the grouped steering matrices to the transmitting device 330. As will be described below, the transmitting device 330 can ensure phase continuity of the steering matrices, ungroup the steering matrices, and calculate pre-coding matrices from the rotated and ungrouped steering matrices. From block 410, the flow ends.

Figure 5:
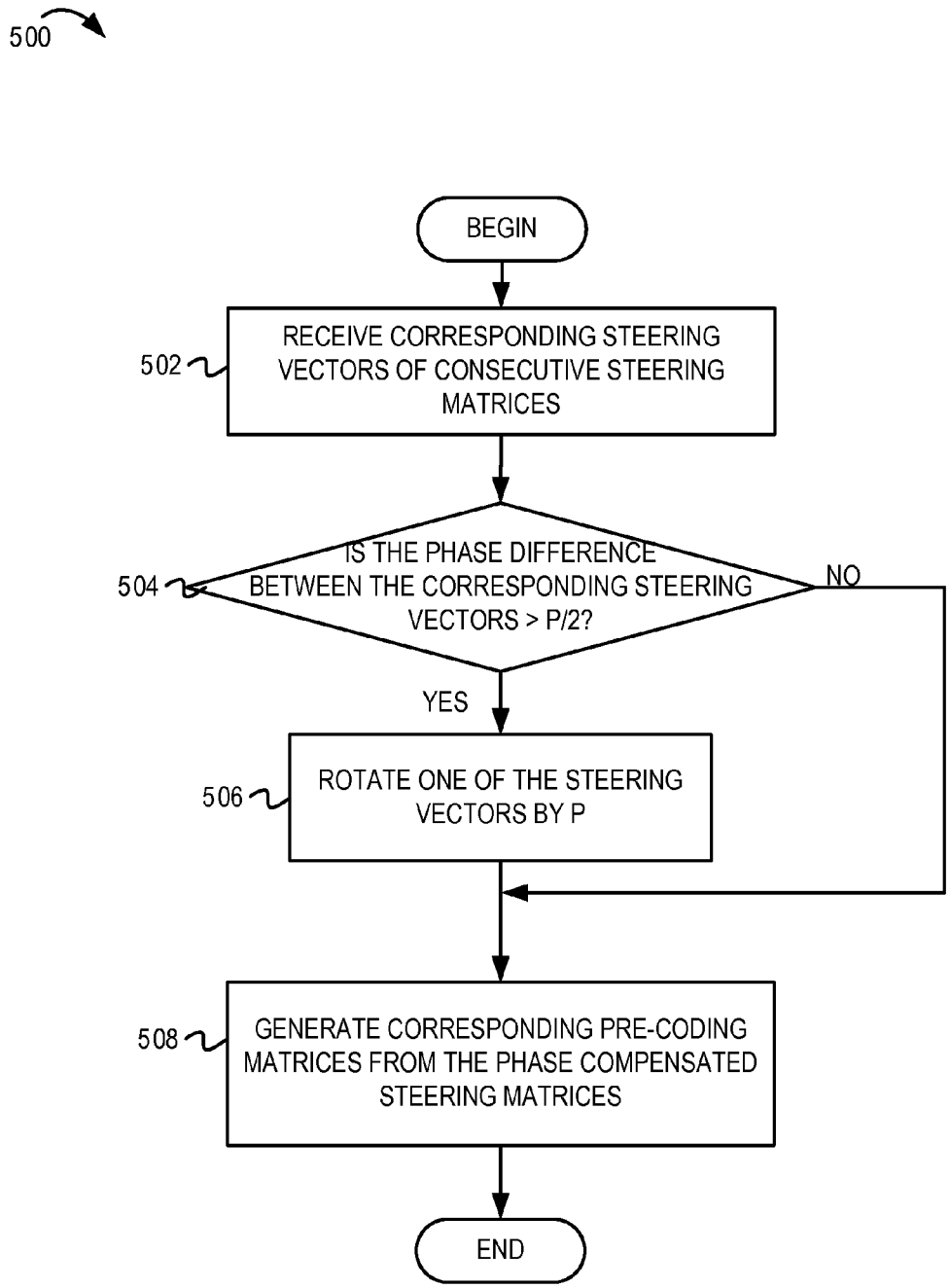
FIG. 5 is a flow diagram illustrating example operations for phase rotation of steering matrices by a fixed phase offset.

FIG. 5 is a flow diagram illustrating example operations for phase rotation of steering matrices by a fixed phase offset. The flow 500 begins at block 502.

At block 502, corresponding steering vectors of consecutive steering matrices are received. For example, the steering matrix processing unit 107 of FIG. 2B can receive the corresponding steering vectors of consecutive steering matrices. In other words, the same columns of steering matrices (i.e., the steering vectors) associated with consecutive sub-carriers that comprise the received RF signal are received. For example, a first sub-carrier may be associated with a first steering matrix and a second consecutive sub-carrier may be associated with a second steering matrix. The flow continues at block 504.

At block 504, it is determined (e.g., by the steering matrix phase difference estimation unit 222) whether the phase difference between the corresponding steering vectors of the consecutive steering matrices is greater than $\pi/2$. Any suitable technique can be used to estimate the phase difference between the corresponding steering vectors of the consecutive steering matrices. With reference to the above example, for the first destination device, where the first sub-carrier is associated with the first steering matrix and the second consecutive sub-carrier is associated with the second steering matrix, the phase of a first steering vector (e.g., column one) of the first steering matrix may be compared against the phase of a corresponding steering vector (e.g., column one) of the second steering matrix. For a given channel matrix H, for each sub-carrier, calculated by a destination device connected to the transmitting device, the channel matrix can be decomposed using SVD as depicted by Eqs. 6.

$$H = USV^*$$
$$= U\Phi S\Phi^* V^*$$

Eqs. 6

With reference to Eq. 6, $\Phi$ is a diagonal matrix with any suitable phase ($e^{j\Phi}$) rotation. Assuming that $\tilde{V}=V\Phi$ is the right matrix generated as a result of the SVD decomposition, the effective channel response ($H_{eff}$) after the pre-coding matrix is applied can be determined to be $H_{eff}=HV\Phi=U\Sigma\Phi$. Therefore, if $\Phi$ is not phase continuous in the frequency domain, interpolation errors can be encountered at the transmitting device and channel smoothing errors can be encountered at the destination device. For example, if the phase between corresponding steering vectors of consecutive steering matrices is close to $\pi$, the amplitude of steering interpolated vectors (using linear interpolation) may be too small. As will be described below, prior to calculating the pre-coding matrix, the phase of the steering vectors is rotated to minimize (or preferably eliminate) the phase difference between consecutive steering matrices. The phase continuity can minimize the interpolation errors and the channel smoothing errors. Phase continuity across the steering matrices can also ensure phase continuity of a combination of steering matrices and consequently of the pre-coding matrix. If it is determined that the phase difference between the corresponding steering vectors of the consecutive steering matrices is greater than $\pi/2$, the flow continues at block 506. Otherwise, the flow continues at block 508.

At block 506, one of the steering vectors is rotated by $\pi$ (e.g., by the steering matrix phase rotation unit 224 of FIG. 2B). As depicted by Eq. 7, $V_{i,k,m}$ represents the $i^{th}$ steering vector of the $k^{th}$ steering matrix and is associated with the $k^{th}$ sub-carrier for the $m^{th}$ destination device. The columns of the steering matrices are rotated in accordance with Eq. 7, if the phase difference $\phi_{i,k,m}$ between the corresponding steering vectors of the consecutive steering matrices.

$$\text{If } \phi_{i,k,m} > \frac{\pi}{2}, \phi_{i,k,m} = \pi, \text{ then } V_{i,k,m} = e^{-j\pi} \cdot V_{i,k,m}$$

Eq. 7

Rotating one of the steering vectors for better phase continuity can maximize the correlation between the steering matrices and minimize random variation of phase in the steering matrices, to establish phase continuity across the steering matrices, or at least to significantly improve phase continuity across the steering matrices. From block 506, the flow continues at block 508.

At block 508, pre-coding matrices are generated from corresponding phase compensated steering matrices at the transmitting device (e.g., an access point). For example, the pseudo-inverse calculation unit 220 can calculate a pseudo-inverse of a combination of one or more steering matrices to yield the pre-coding matrices. As described above, the pre-coding matrix computation unit 108 can determine one steering matrix per sub-carrier, for each destination device. The pre-coding matrix computation unit 108 can arrange, for each sub-carrier, the steering matrix associated with each destination device and the sub-carrier under consideration to yield an equivalent steering matrix for each sub-carrier, as depicted above in Eq. 5. A pre-coding matrix for each sub-carrier can be computed from the corresponding equivalent steering matrix. The pre-coding matrix can be associated with all destination devices connected to the transmitting device, as described above with reference to FIG. 3 and as will be described below with reference to FIG. 7. From block 508, the flow ends.

Figure 6:
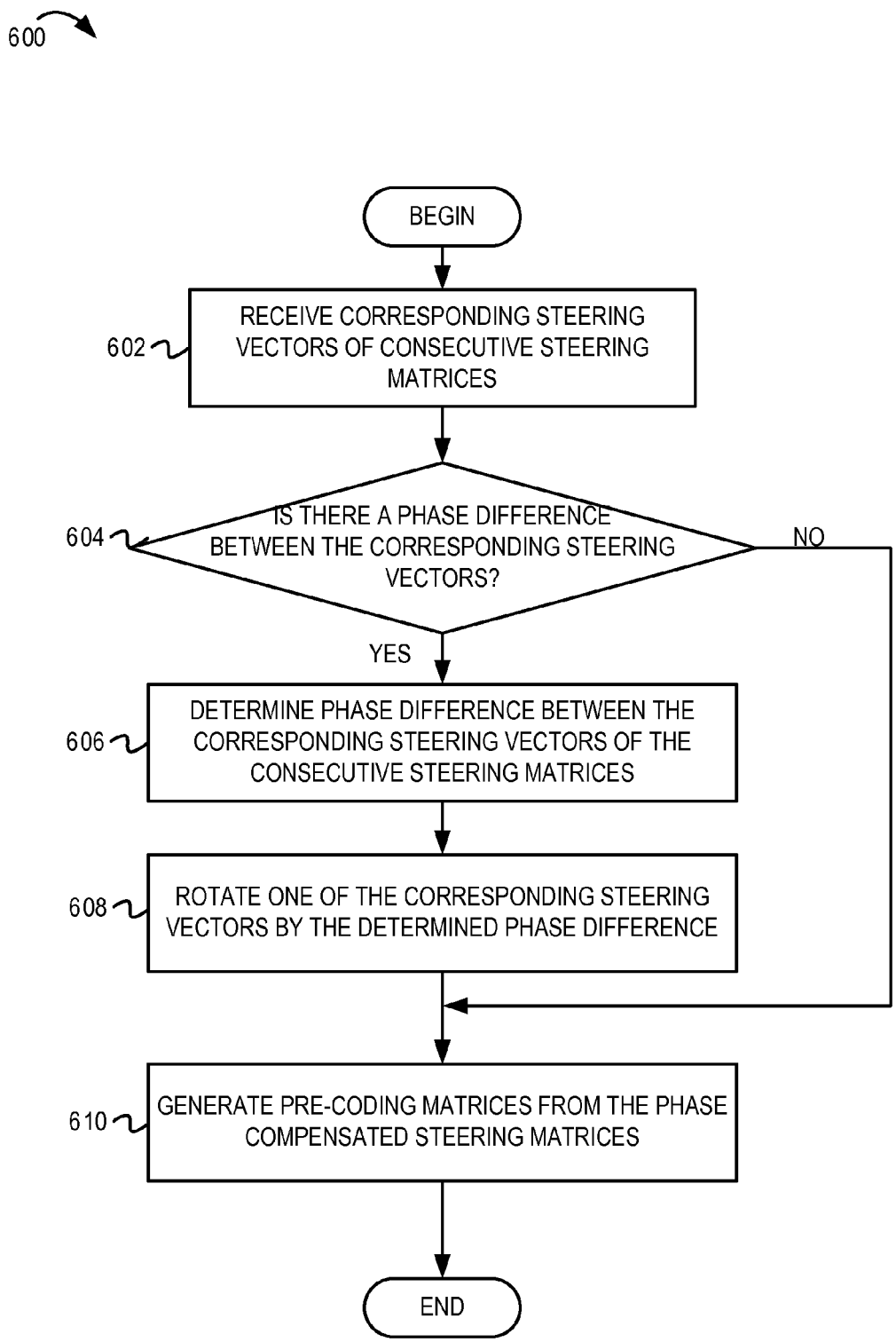
FIG. 6 is a flow diagram illustrating example operations for phase rotation of steering matrices by a variable phase offset.

FIG. 6 is a flow diagram illustrating example operations for phase rotation of steering matrices by a variable phase offset. The flow 600 begins at block 602.

At block 602, corresponding steering vectors of consecutive steering matrices are received. For example, the steering matrix processing unit 107 of FIG. 2B can receive the corresponding steering vectors of consecutive steering matrices. For example, a first sub-carrier may be associated with a first steering matrix and a second consecutive sub-carrier may be associated with a second steering matrix. The flow continues at block 604.

At block 604, it is determined (e.g., by the steering matrix phase difference estimation unit 222 of FIG. 2B) at the transmitting device whether there is a phase difference between the corresponding steering vectors of the steering matrices. Any suitable technique can be used to estimate the phase difference between the corresponding steering vectors of the consecutive steering matrices. A phase difference between the corresponding steering vectors of the consecutive steering matrices can be determined by comparing the phase of a first row in the consecutive steering vectors. The phase difference may also be determined by cross correlating the corresponding steering vectors of the consecutive steering matrices. If it is determined that there is a phase difference between the corresponding steering vectors of the consecutive steering matrices, the flow continues at block 606. Otherwise, the flow continues at block 610.

At block 606, the phase difference between the corresponding steering vectors of the consecutive steering matrices is determined at the transmitting device 330 (e.g., by the steering matrix phase difference estimation unit 222 of FIG. 2B). The phase difference $\phi_{i,k,m}$ between the corresponding steering vectors of the consecutive steering matrices is calculated using Eq. 8. In Eq. 8, $\phi_{i,k,m}$ is the phase difference between the steering vectors $V_{i,k-1,m}$ and $V_{i,k,m}$. The steering vector $V_{i,k,m}$ represents the $i^{th}$ steering vector of the $k^{th}$ steering matrix and is associated with the $k^{th}$ sub-carrier for the $m^{th}$ destination device. The steering vector $V_{i,k-1,m}$ represents the $i^{th}$ steering vector of the $k-1^{th}$ steering matrix and is associated with the $k-1^{th}$ sub-carrier for the $m^{th}$ destination device. The flow continues at block 608.

$$\phi_{i,k,m} = \text{angle}(V_{i,k-1,m}^* \cdot V_{i,k,m})$$

Eq. 8

At block 608, one of the steering vectors is rotated (e.g., by the steering matrix phase rotation unit 224 of FIG. 2B) by the determined phase difference at the transmitting device. In Eq. 9, the phase of steering matrix is rotated by $\phi_{i,k,m}$.

$$V_{i,k,m} = V_{i,k,m} \cdot \exp(-j\phi_{i,k,m})$$

Eq. 9

In performing the operation described by Eq. 9, the phase of correlation between the corresponding steering vectors of the consecutive steering matrices $V_{i,k,m}$ and $V_{i,k-1,m}$ can be maximized. As described above, operations for phase difference estimation and phase rotation are successively performed on the corresponding steering vectors of the consecutive steering matrices for each receiving device to establish phase continuity across the steering matrices associated with each receiving device connected to the transmitting device, or at least to significantly improve phase continuity across the steering matrices. Phase continuity across the steering matrices can also ensure phase continuity of a combination of steering matrices and consequently of the pre-coding matrix. From block 608, the flow continues at block 610.

At block 610, pre-coding matrices are generated from corresponding phase compensated steering matrices at the transmitting device (e.g., an access point). For example, the pseudo-inverse calculation unit 220 can calculate a pseudo-inverse of the equivalent steering matrices to yield the pre-coding matrices associated with the destination devices. The pre-coding matrix computation unit 108 can determine one steering matrix per sub-carrier, for each destination device. The pre-coding matrix computation unit 108 can arrange, for each sub-carrier the steering matrix associated with each destination device and the sub-carrier under consideration to yield an equivalent steering matrix for each sub-carrier, as depicted above in Eq. 5. A pre-coding matrix for each sub-carrier can be computed from the corresponding equivalent steering matrix. The pre-coding matrix can be associated with all destination devices connected to the transmitting device, as described above with reference to FIG. 3 and as will be described below with reference to FIG. 7. By ensuring phase continuity across the steering matrices for each destination device, the pre-coding matrices associated with the destination devices can be made phase continuous. From block 610, the flow ends.

Figure 7:
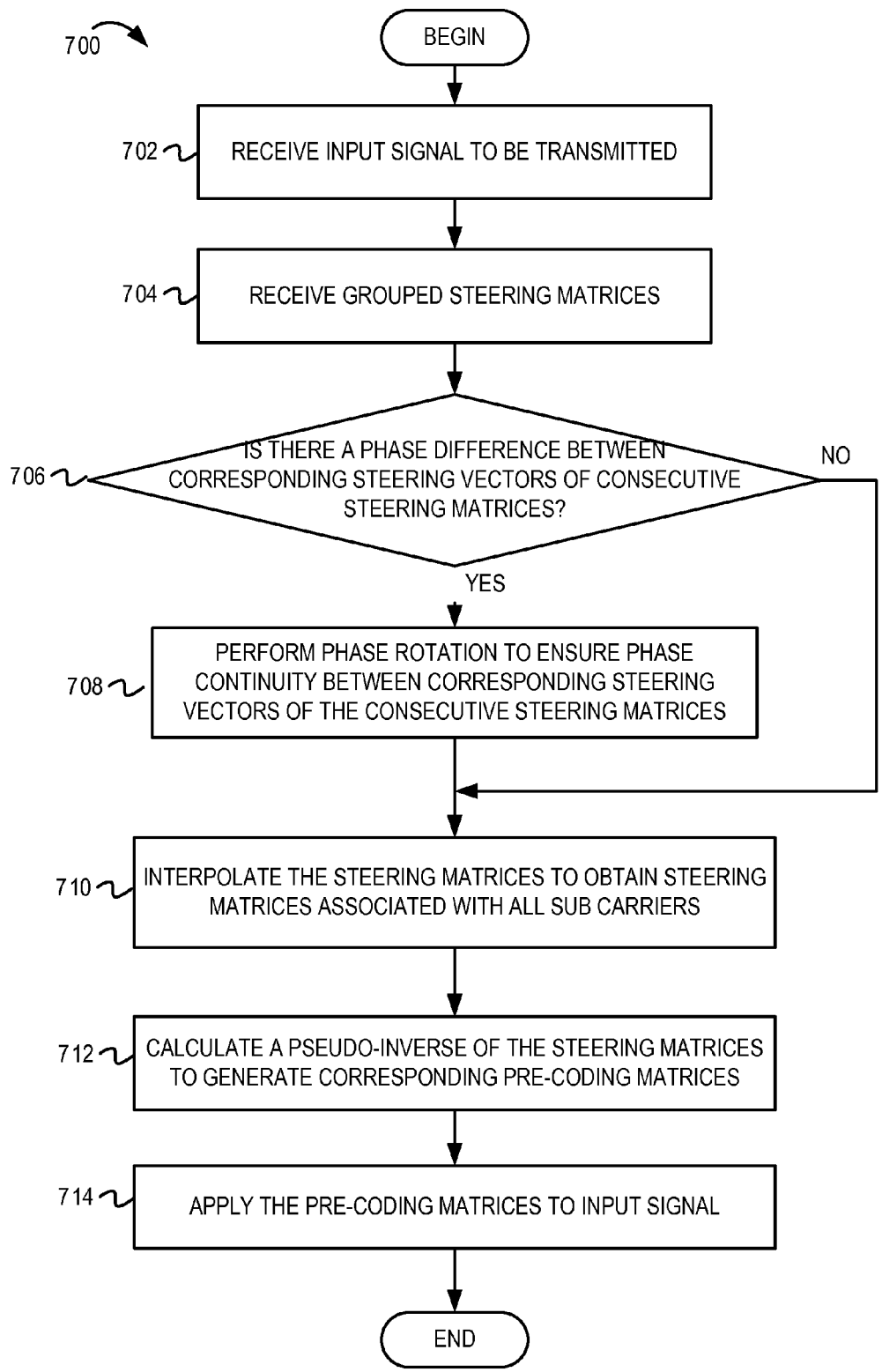
FIG. 7 is a flow diagram illustrating example operations for generating and applying pre-coding matrices.

FIG. 7 is a flow diagram illustrating example operations for generating and applying pre-coding matrices. The flow 700 begins at block 702.

At block 702, an input signal comprising one or more symbols to be transmitted is received. For example, the pre-coding matrix computation unit 108 and/or the multipliers 112 of FIG. 1 may receive the input signal. The input signal may comprise information modulated on to one or more subcarriers depending on the modulation and coding scheme used. In other implementations, N independent unmodulated data streams may be received, where N is the number of subcarriers. The input signal can comprise multiple distinct data streams. A subset of one or more of the multiple data streams can be simultaneously (in time and along the same communication channel) provided to each destination device connected to the transmitting device. The flow continues at block 704.

At block 704, grouped steering matrices are retrieved. In some implementations, the retrieved steering matrices may also be compressed. The grouped and compressed steering matrices may be retrieved from a storage unit embodied as part of a transmitting device 330. Typically, the number of steering matrices is dependent on the number of sub-carriers that comprise the input signal. Also, the order of the steering matrices may be influenced by the number of space-time streams and a number of transmit chains and a number of destination devices connected to a transmitting device. It is noted that if the retrieved steering matrices were compressed, a steering matrix decompression unit can decompress the steering matrices using any suitable decompression techniques corresponding to the compression techniques employed. For example, decompression techniques may be applied to retrieve matrix elements from the Givens angles associated with the steering matrix. As another example, matrix transformation operations may be used to regenerate the steering matrices from a diagonal or triangular matrix. The flow continues at block 706.

At block 706, it is determined (e.g., by the steering matrix phase difference estimation unit 222 of FIG. 2B) whether there is a phase difference between corresponding steering vectors of consecutive steering matrices of each destination device. Although channel matrices associated with the OFDM subcarriers are continuous in phase, an arbitrary phase resulting from the SVD process can result in a phase difference between consecutive steering matrices which, in turn, can result in a phase difference between consecutive pre-coding matrices. A lack of phase continuity can result in incorrect interpolation when regenerating the steering matrices from grouped steering matrices. Incorrect interpolation can further lead to incorrect pre-coding matrices being applied to data to be transmitted. This can impair beamforming and downlink multi-user (DL-MU) performance. Phase discontinuity or phase difference between corresponding steering vectors of the consecutive steering matrices can be determined by comparing the phase of a first row in a first steering vector with the phase of a first row in a consecutive steering vector. The phase difference may also be determined by cross correlating the corresponding steering vectors of the consecutive steering matrices. The flow continues at block 708.

At block 708, one of the steering vectors is phase rotated (e.g., by the steering matrix phase rotation unit 224 of FIG. 2B) for phase continuity between the corresponding steering vectors of the consecutive steering matrices. In some implementations, if it is determined that the phase difference between the corresponding steering vectors of the consecutive steering matrices is greater than $\pi/2$, one of the steering vectors may be rotated by $\pi$. This technique can be used in implementations where coarse phase rotation and a slight phase difference between the corresponding steering vectors of the consecutive steering matrices (and consequently between the corresponding pre-coding vectors of the consecutive pre-coding matrices) is acceptable. For precise phase correction and for zero phase difference between the corresponding steering vectors of the consecutive steering matrices (and consequently between the corresponding pre-coding vectors of the consecutive pre-coding matrices), one of the steering vectors may be rotated by the exact phase difference between the two steering vectors. Rotating the steering vectors does not affect the beamforming directionality, as a rotated eigenvector of $(H_i^* H_i)$ is also an eigenvector of $(H_i^* H_i)$. It should be noted that operations for phase difference estimation and phase rotation are performed for corresponding steering vectors for each set of consecutive steering matrices associated with the subcarriers. Phase difference estimation and phase rotation are successively performed on the corresponding steering vectors associated with each set of the consecutive steering matrices to establish phase continuity across the steering matrices, or at least to significantly improve phase continuity across the steering matrices. Phase continuity across the steering matrices can also ensure phase continuity of a combination of steering matrices and consequently of the pre-coding matrix. The flow continues at block 710.

At block 710, interpolation is performed on the phase-compensated steering matrices to obtain steering matrices associated with all the sub-carriers for each of the destination devices. For example, the steering matrix interpolation unit 226 of FIG. 2B may perform interpolation. Interpolation is used to retrieve the steering matrices that were discarded during the grouping process. Any suitable interpolation techniques (e.g., linear interpolation, spline interpolation, etc.) can be used to determine the steering matrices that were discarded during the grouping process. To interpolate the decompressed steering matrices, one or more of Givens rotation angles associated with the decompressed steering matrices and a grouping factor may be known. The flow continues at block 712.

At block 712, a pseudo-inverse of the steering matrices is calculated to generate corresponding pre-coding matrices.

For example, the pseudo-inverse calculation unit 220 of FIG. 2B can calculate the pseudo-inverse of a combination of the steering matrices to generate corresponding pre-coding matrices, as described above with reference to FIGS. 1-3. Also, as described above with reference to FIGS. 1-6, the combination of steering matrices can be generated for each sub-carrier by arranging the steering matrices, corresponding to the sub-carrier, associated with each destination device into the equivalent steering matrix. Consequently, a pre-coding matrix for each-sub-carrier can be calculated from the corresponding equivalent steering matrix for the sub-carrier. The flow continues at block 714.

At block 714, the pre-coding matrices are applied to the input signals to generate data streams for each destination device connected to the transmitting device. For example, a beamforming processing unit of the transmitting device can apply the pre-coding matrices to the input signals to generate data streams for each destination device. From block 714, the flow ends.

It should be understood that the depicted diagrams are examples meant to aid in understanding embodiments and should not be used to limit embodiments or limit scope of the claims. Embodiments may perform additional operations, fewer operations, operations in a different order, operations in parallel, and some operations differently. For example, in some implementations, operations for channel estimation, pre-coding matrix calculation, and pre-coding matrix phase compensation as described herein can be executed frequently (e.g., at regular intervals, on determining a change in channel performance parameters) to modify the pre-coding matrices in accordance with channel variations. Also, although examples refer to the pseudo-inverse calculation unit 220 calculating a pseudo inverse of a combination of steering matrices associated with the destination devices to yield the pre-coding matrices, embodiments are not so limited. In other embodiments, the pre-coding matrix computation unit 108 can use any suitable techniques to calculate the pre-coding matrices.

Although the Figures describe the transmitting device receiving the grouped steering matrices from each destination device connected to the transmitting device, the steering matrix information can be communicated from the destination devices to the transmitting device in any suitable format. For example, the transmitting device may receive A) only the channel estimates, B) ungrouped and uncompressed steering matrices, C) ungrouped compressed steering matrices, D) grouped uncompressed steering matrices, and/or E) grouped and compressed steering matrices. Furthermore, it is noted that only the pre-coding matrices are applied to the data to be transmitted. The steering matrices are used to calculate the pre-coding matrices and may not be applied to the data to be transmitted. Lastly, although embodiments described herein calculate the pre-coding matrices by determining the pseudo-inverse of the steering matrices, in other embodiments various other techniques can be used to calculate the pre-coding matrices from the channel estimates and/or from the steering matrices.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
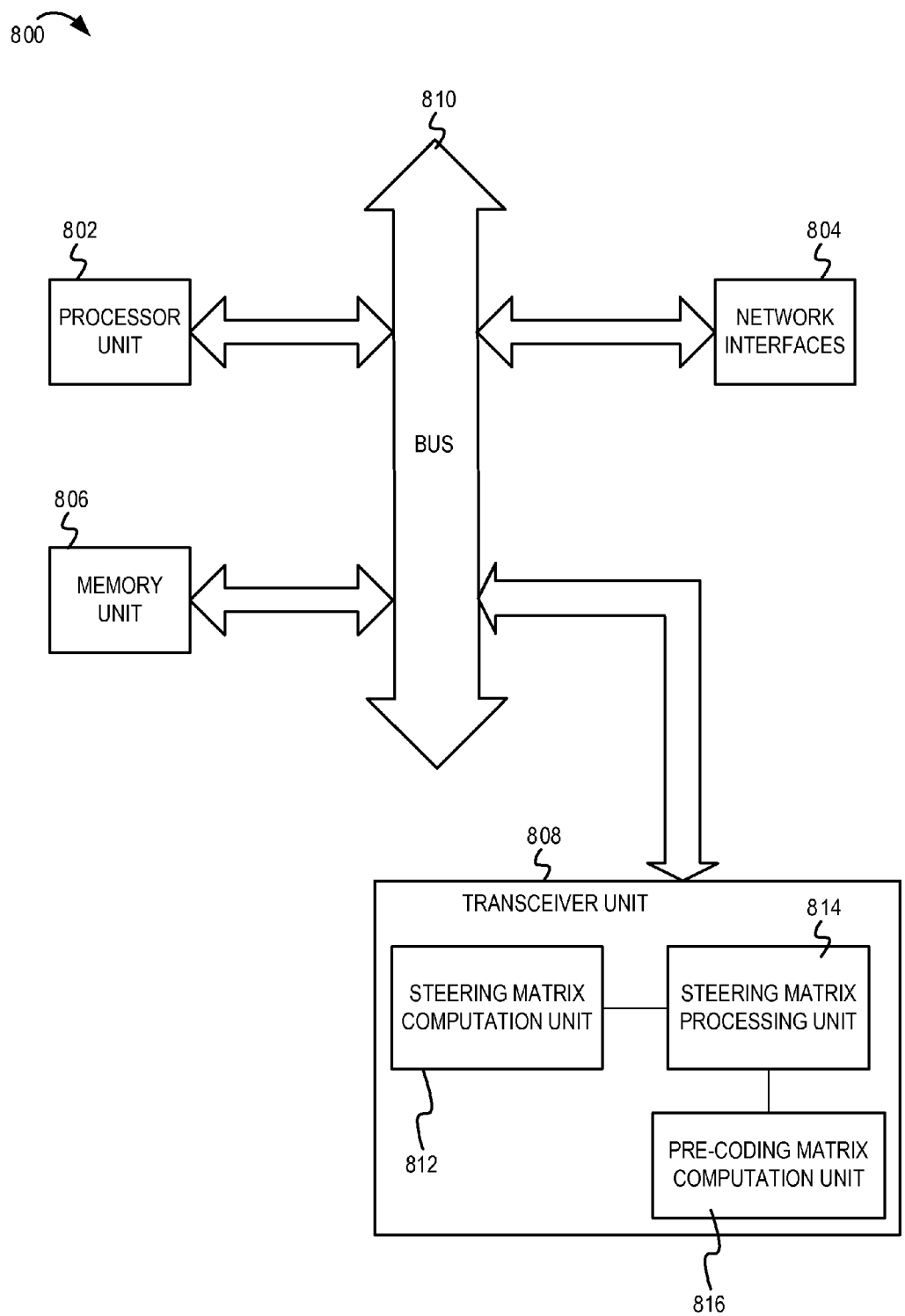
FIG. 8 is a block diagram of a wireless device including a mechanism for phase rotation and interpolation techniques in a multi-user environment.

FIG. 8 is a block diagram of a wireless device including a mechanism for phase rotation and interpolation techniques in a multi-user environment. In one implementation, the wireless device 800 may be a WLAN device. The wireless device 800 includes a processor unit 802 (possibly including multiple processors, multiple cores, multiple nodes, and/or implementing multi-threading, etc.). The wireless device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The wireless device 800 also includes a bus 810 (e.g., PCI, ISA, PCI-Express, HyperTransport®, InfiniBand®, NuBus, etc.), and network interfaces 804 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface).

The wireless device 800 also includes a transceiver unit 808. In one implementation, the transceiver unit 808 comprises a steering matrix computation unit 812, a steering matrix processing unit 814, and a pre-coding matrix computation unit 816. The steering matrix computation unit 812 and the steering matrix processing unit 814 comprise functionality to determine steering matrices in accordance with FIGS. 1-7. The pre-coding matrix computation unit 816 can calculate the pre-coding matrices associated with the steering matrices. The pre-coding matrix computation unit 816 can apply the pre-coding matrices to the data to be transmitted to minimize interference between multiple destination devices, as described above with reference to FIGS. 1-7.

Any one of the above-described functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., additional network interfaces, peripheral devices, etc.). The processor unit 802 and the network interfaces 804 are coupled to the bus 810. Although illustrated as being coupled to the bus 810, the memory 806 may be coupled to the processor unit 802.

While the embodiments are described with reference to various implementations and exploitations, it will be understood that these embodiments are illustrative and that the scope of the inventive subject matter is not limited to them. In general, techniques for phase rotation techniques in a downlink multi-user wireless communication environment as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a first network device, a first plurality of beamforming steering matrices for communicating with a first destination network device and a second plurality of beamforming steering matrices for communicating with a second destination network device based, at least in part, on a first radio frequency (RF) signal received from the first destination network device and a second RF signal received from the second destination network device;
   for at least the first destination network device,
      determining a phase difference between a first beamforming steering vector of a first beamforming steering matrix and a corresponding beamforming steering vector of a second beamforming steering matrix of the first plurality of beamforming steering matrices based, at least in part, on comparing a first phase of a first row of the first beamforming steering vector of the first beamforming steering matrix with a second phase of a first row of the corresponding beamforming steering vector of the second beamforming steering matrix,
      wherein the first beamforming steering matrix is associated with a first sub-carrier of the first RF signal and the second beamforming steering matrix is associated with a second sub-carrier of the first RF signal that is consecutive to the first sub-carrier;
   performing, at the first network device, phase rotation on the first beamforming steering vector based, at least in part, on the phase difference;
   combining, at the first network device, the first plurality of beamforming steering matrices and the second plurality of beamforming steering matrices;
   determining, at the first network device, a pre-coding matrix based, at least in part, on a combination of the first plurality of beamforming steering matrices and the second plurality of beamforming steering matrices;
   applying the pre-coding matrix to data to be transmitted to the first destination network device and the second destination network device to mitigate interference between the first destination network device and the second destination network device; and
   transmitting the data to the first destination network device and the second destination network device.

2. The method of claim 1, wherein said determining the pre-coding matrix comprises:
   for the first sub-carrier of the first RF signal and the second RF signal,
      identifying the first beamforming steering matrix of the first plurality of beamforming steering matrices and a third beamforming steering matrix of the second plurality of beamforming steering matrices, wherein the first beamforming steering matrix and the third beamforming steering matrix are associated with the first sub-carrier;
      combining the first beamforming steering matrix and the third beamforming steering matrix to yield an equivalent beamforming steering matrix that is associated with the first sub-carrier; and
      determining a pseudo-inverse of the equivalent beamforming steering matrix to yield the pre-coding matrix associated with the first sub-carrier, the first destination network device, and the second destination network device.

3. The method of claim 1, further comprising at least one member of a group consisting of:
   decompressing, at the first network device, the first plurality of beamforming steering matrices, and
   interpolating, at the first network device, the first plurality of beamforming steering matrices to ungroup the first plurality of beamforming steering matrices.

4. The method of claim 1, further comprising:
   determining whether the phase difference between the first beamforming steering vector of the first beamforming steering matrix and the corresponding beamforming steering vector of the second beamforming steering matrix is greater than $\pi/2$; and
   performing phase rotation by rotating the first beamforming steering vector of the first beamforming steering matrix by $\pi$ in response to determining that the phase difference is greater than $\pi/2$.

5. The method of claim 1, wherein said performing phase rotation comprises:
   rotating the first beamforming steering vector of the first beamforming steering matrix by the phase difference.

6. The method of claim 1, further comprising performing singular value decomposition (SVD) on channel estimates associated with a plurality of sub-carriers of the first RF signal received from the first destination network device to generate the first plurality of beamforming steering matrices for communicating with the first destination network device.

7. The method of claim 1, wherein the first network device, the first destination network device, and the second destination network device are wireless local area network (WLAN) devices.

8. The method of claim 1, further comprising:
generating the first plurality of beamforming steering matrices associated with a plurality of sub-carriers;
compressing the first plurality of beamforming steering matrices; and
storing the first plurality of beamforming steering matrices.

9. The method of claim 8, further comprising grouping the first plurality of beamforming steering matrices prior to said storing the first plurality of beamforming steering matrices.

10. The method of claim 1, wherein said determining the phase difference is based, at least in part, on cross-correlating the first beamforming steering vector of the first beamforming steering matrix and the corresponding beamforming steering vector of the second beamforming steering matrix.

11. The method of claim 1, wherein said determining the first plurality of beamforming steering matrices comprises:
receiving the first plurality of beamforming steering matrices from the first destination network device in the first RF signal.

12. A first network device comprising:
a processor; and
a memory to store instructions, which when executed by the processor, cause the first network device to:
determine a first plurality of beamforming steering matrices for communicating with a first destination network device and a second plurality of beamforming steering matrices for communicating with a second destination network device based, at least in part, on a first radio frequency (RF) signal received from the first destination network device and a second RF signal received from the second destination network device;
for at least the first destination network device,
determine a phase difference between a first beamforming steering vector of a first beamforming steering matrix and a corresponding beamforming steering vector of a second beamforming steering matrix of the first plurality of beamforming steering matrices based, at least in part, on comparing a first phase of a first row of the first beamforming steering vector of the first beamforming steering matrix with a second phase of a first row of the corresponding beamforming steering vector of the second beamforming steering matrix,
wherein the first beamforming steering matrix is associated with a first sub-carrier of the first RF signal and the second beamforming steering matrix is associated with a second sub-carrier of the first RF signal that is consecutive to the first sub-carrier;
perform phase rotation on the first beamforming steering vector based, at least in part, on the phase difference;
combine the first plurality of beamforming steering matrices and the second plurality of beamforming steering matrices;
determine a pre-coding matrix based, at least in part, on a combination of the first plurality of beamforming steering matrices and the second plurality of beamforming steering matrices;
apply the pre-coding matrix to data to be transmitted to the first destination network device and the second destination network device to mitigate interference between the first destination network device and the second destination network device; and
transmit the data to the first destination network device and the second destination network device.

13. The first network device of claim 12, wherein causing the first network device to determine the pre-coding matrix comprises causing the first network device to:
for the first sub-carrier of the first RF signal and the second RF signal,
identify the first beamforming steering matrix of the first plurality of beamforming steering matrices and a third beamforming steering matrix of the second plurality of beamforming steering matrices, wherein the first beamforming steering matrix and the third beamforming steering matrix are associated with the first sub-carrier;
combine the first beamforming steering matrix and the third beamforming steering matrix to yield an equivalent beamforming steering matrix that is associated with the first sub-carrier; and
determine a pseudo-inverse of the equivalent beamforming steering matrix to yield the pre-coding matrix associated with the first sub-carrier, the first destination network device, and the second destination network device.

14. The first network device of claim 12, wherein the instructions, which when executed by the processor, cause the first network device to perform at least one member of a group consisting of:
decompress the first plurality of beamforming steering matrices, and
interpolate the first plurality of beamforming steering matrices to ungroup the first plurality of beamforming steering matrices.

15. The first network device of claim 12, wherein the instructions, which when executed by the processor, cause the first network device to:
determine whether the phase difference between the first beamforming steering vector of the first beamforming steering matrix and the corresponding beamforming steering vector of the second beamforming steering matrix is greater than $\pi/2$; and
rotate the first beamforming steering vector of the first beamforming steering matrix by $\pi$ in response to determining that the phase difference is greater than $\pi/2$.

16. The first network device of claim 12, wherein causing the first network device to perform phase rotation comprises causing the first network device to: rotate the first beamforming steering vector of the first beamforming steering matrix by the phase difference.

17. A non-transitory machine-readable storage medium, having instructions stored therein, which, when executed by a processor causes the processor to perform operations that comprise:
determining, at a first network device, a first plurality of beamforming steering matrices for communicating with a first destination network device and a second plurality of beamforming steering matrices for communicating with a second destination network device based, at least in part, on a first radio frequency (RF) signal received from the first destination network device and a second RF signal received from the second destination network device;

for at least the first destination network device,
determining a phase difference between a first beamforming steering vector of a first beamforming steering matrix and a corresponding beamforming steering vector of a second beamforming steering matrix of the first plurality of beamforming steering matrices based, at least in part, on comparing a first phase of a first row of the first beamforming steering vector of the first beamforming steering matrix with a second phase of a first row of the corresponding beamforming steering vector of the second beamforming steering matrix,
wherein the first beamforming steering matrix is associated with a first sub-carrier of the first RF signal and the second beamforming steering matrix is associated with a second sub-carrier of the first RF signal that is consecutive to the first sub-carrier;
performing phase rotation on the first beamforming steering vector of the first beamforming steering matrix based, at least in part, on the phase difference;
combining the first plurality of beamforming steering matrices and the second plurality of beamforming steering matrices;
determining a pre-coding matrix based, at least in part, on a combination of the first plurality of beamforming steering matrices and the second plurality of beamforming steering matrices;
applying the pre-coding matrix to data to be transmitted to the first destination network device and the second destination network device to mitigate interference between the first destination network device and the second destination network device; and
transmitting the data to the first destination network device and the second destination network device.

18. The non-transitory machine-readable storage medium of claim 17, wherein said operation of determining the pre-coding matrix comprises:
for the first sub-carrier of the first RF signal and the second RF signal,
identifying the first beamforming steering matrix of the first plurality of beamforming steering matrices and a third beamforming steering matrix of the second plurality of beamforming steering matrices, wherein the first beamforming steering matrix and the third beamforming steering matrix are associated with the first sub-carrier;
combining the first beamforming steering matrix and the third beamforming steering matrix to yield an equivalent beamforming steering matrix that is associated with the first sub-carrier; and
determining a pseudo-inverse of the equivalent beamforming steering matrix to yield the pre-coding matrix associated with the first sub-carrier, the first destination network device, and the second destination network device.

19. The non-transitory machine-readable storage medium of claim 17, wherein the operations further comprise:
determining whether the phase difference between the first beamforming steering vector of the first beamforming steering matrix and the corresponding beamforming steering vector of the second beamforming steering matrix is greater than $\pi/2$; and
performing phase rotation by rotating the first beamforming steering vector of the first beamforming steering matrix by $\pi$ in response to determining that the phase difference is greater than $\pi/2$.

20. The non-transitory machine-readable storage medium of claim 19, wherein said operation for performing phase rotation comprises:
rotating the first beamforming steering vector of the first beamforming steering matrix by the phase difference.

* * * * *